April 1, 1930.  G. A. SIEFKEN  1,752,858
BROOCH FASTENING DEVICE
Filed Aug. 10, 1929
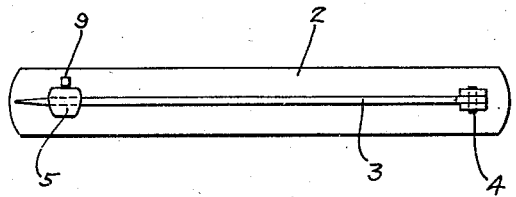
FIG. 1
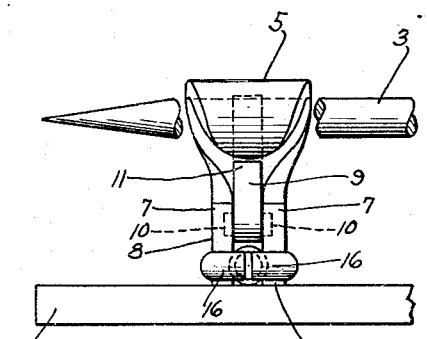
FIG. 2
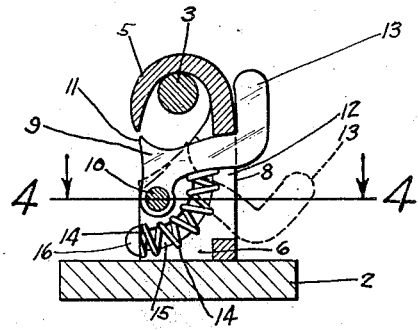
FIG. 3
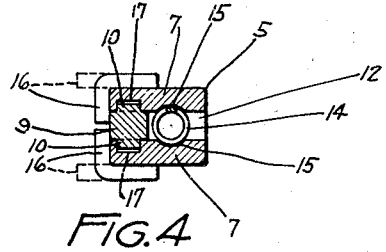
FIG. 4
FIG. 5
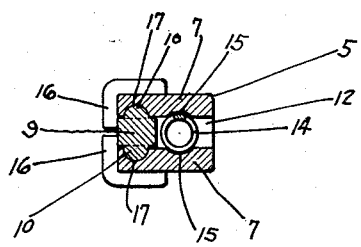
FIG. 6
Inventor
GUSTAVUS A. SIEFKEN
By Paul, Paul & Moore
ATTORNEYS Patented Apr. 1, 1930

1,752,858

UNITED STATES PATENT OFFICE

GUSTAVUS A. SIEFKEN, OF MINNEAPOLIS, MINNESOTA

BROOCH-FASTENING DEVICE

Application filed August 10, 1929. Serial No. 384,976.

This invention relates to safety fastening devices for brooches, breast pins, badges and the like, and an object of the invention is provide means for preventing the accidental disengagement of the pin from its guard and thereby preventing possible loss of the brooch or other article of jewelry.

A further object is to provide a safety fastening device which will be positive and reliable in its action and one that cannot possibly become accidentally displaced.

And a still further object is to provide a brooch-fastening device which will present novel and specific features constituting a distinct improvement over the features of the brooch fastening device of my Patent No. 1,242,054, granted October 2, 1917.

The invention consists generally in various constructions and combinations, all as hereinafter described and particularly pointed out in the claims.

In the accompanying drawing forming a part of this specification:

Figure 1 is a bottom view of a brooch with the invention applied thereto;

Figure 2 is an enlarged detail view of the guard and safety device;

Figure 3 is a similar view in section, showing the preferred construction and manner of mounting the safety catch;

Figure 4 is a detail sectional view taken as on line 4—4 of Figure 3;

Figure 5 is a view, corresponding generally with the disclosure of Figure 3, but showing the safety catch and the coil spring removed, and the brooch pin omitted; and Figure 6 is a view corresponding generally with the disclosure of Figure 4, of a modified form of mounting for the safety catch.

In the drawing, 2 represents the back portion of a brooch of ordinary construction, which I have used to illustrate the application of my invention. Numeral 3 denotes a pin pivoted at 4 on the back of the brooch, and 5 is a pin guard, made as usual in the form of a hook and having a lower portion 6 that is mounted on the back of the brooch. The lower portion 6 includes spaced side walls 7 adjacent a rearward wall or shank 8 of the pin guard or hook. Numeral 9 indicates a safety catch pivoted, as at 10, in the forward portions of the side walls 7 at location in spaced relation to the brooch. A tooth or lug 11 upon the upper, forward edge of the safety catch projects upwardly to a point near the end of the hook, and said safety catch is mounted to rock within a slot 12 in the rearward wall or shank of the pin guard or hook, upper and lower walls of said slot 12 limiting the throw of an arm or finger grip 13 of the safety catch, as very clearly illustrated in full and dotted lines in Fig. 3.

A coil spring 14, the opposite sides of which are fitted to arcuate guide slots 15 in the opposed faces of the side walls 7 of the pin guard and extending from position between the safety catch pivot 10 and the brooch to location at the side of said pivot 10 adjacent the shank of the pin guard, engages the safety catch, desirably at a location above the elevation of the pivot 10, to normally urge the arm 13 against the upper end of the slot 12 to thus position the tooth or lug 11 in the closed position of the fastening device, as said tooth or lug is shown in full lines in Fig. 3. Movement of the arm 13 to the dotted line position of Fig. 3, to open the fastening device, compresses the coil spring 14 along the lengths of the arcuate guide slots 15, and when said arm 13 is released, said coil spring immediately returns the safety catch to its normal position, as will be evident.

An important feature of the present invention resides in the compact arrangement of the coil spring 14 relatively to the brooch, the pin guard, and the safety catch and its pivot as disclosed. By providing the arcuate guide slots 15, positioned as already set forth, to receive the coil spring 14 bent to curvilinear form, the overall height of the pin guard can be made much less than the overall height of the similar element in my Patent No. 1,242,054, above referred to.

As shown very clearly in Figs. 2 to 6, I prefer to provide the forward side edges of the side walls 7 with suitably secured tabs or straps 16, situated adjacent the lower, forward ends of the arcuate guide slots 15, adapted to be bent inwardly toward each other, after the coil spring is inserted between the side walls 7 and into the arcuate guide slots, to retain the lower, forward end of said coil spring in the arcuate guide slots. I could, however, fasten the lower, forward portion of the coil spring in the arcuate guide slots in some other manner (not disclosed).

As shown in Fig. 4, the pivot 10 for the safety catch 9 consists of pintles arranged in circular depressions 17 in the side walls 7, the outer portions of the pintles and the bases of the depressions constituting flat surfaces. As shown in Fig. 6, the pivot 10 also consists of pintles arranged in circular depressions, the outer portions of the pintles and the bases of the depressions being generally rounded.

It will be seen that the construction as illustrated and described makes provision for easy assembly of the parts of the brooch fastening device into an operative unit ready to be attached to a brooch.

To use the device, the arm 13 is pressed backwardly to the position indicated by dotted lines in Fig. 3, thereby exposing the gap between the catch and the end of the guard. When the pin has been inserted under the guard, the arm 13 is released. The catch returns to its full line position to prevent disengagement of the pin from the guard until the catch is again retracted.

I claim as my invention:

1. The combination with a pin guard having a hook portion and slotted opening in the shank thereof and a curved recess adjacent said opening, of a catch pivoted within said opening beneath the point of said guard and having a lug projecting upwardly to a position adjacent to the end of said guard, a spring mounted within said curved recess to engage said catch for normally holding said lug near the end of said guard and across the opening of said hook portion, and said catch having an arm forming a finger grip for tilting said catch against the tension of said spring and moving said lug to expose the opening in the hook portion of said guard.

2. The combination with a pin guard having a hook portion and slotted opening in the shank thereof and a recess adjacent said opening at a side and approximately in the plane thereof, of a catch pivoted within said opening beneath the point of said guard and having a lug projecting upwardly to a position adjacent to the end of said guard, a spring mounted within said recess to engage said catch for normally holding said lug near the end of said guard and across the opening of said hook portion, and said catch having an arm forming a finger grip for tilting said catch against the tension of said spring and moving said lug to expose the opening in the hook portion of said guard.

3. The combination with a pin guard having a hook portion and slotted opening in the shank thereof and a curvilinear recess adjacent said opening, of a catch pivoted within said opening beneath the end of said guard and having a lug projecting upwardly to a position adjacent said end of the guard, said curvilinear recess extending from position adjacent and partially surrounding the axis of said catch, a spring guided by said recess to engage said catch for normally holding said lug near the end of said guard and across the opening of said hook portion, and said catch having an arm forming a finger grip for tilting said catch against the tension of said spring and moving said lug to expose the opening in the hook portion of said guard.

4. The combination with a pin guard having a hook portion and slotted opening in the shank thereof and spaced side walls adjacent said shank including oppositely disposed curvilinear recesses, of a catch pivoted between said side walls beneath the end of said guard and arranged within said opening, said catch having a lug projecting upwardly to a position adjacent said end of the guard, and said curvilinear recesses extending from position adjacent and partially surrounding the axis of said catch, a coil spring mounted between and guided by said recesses to engage said catch for normally holding said lug near the end of said guard and across the opening of said hook portion, and said catch having an arm forming a finger grip for tilting said catch against the tension of said spring and moving said lug to expose the opening in the hook portion of said guard.

5. The combination with a pin guard having a hook portion and slotted opening in the shank thereof and spaced side walls adjacent said shank including oppositely disposed curvilinear recesses, of a catch pivoted between said side walls beneath the end of said guard and arranged within said opening, said catch having a lug projecting upwardly to a position adjacent said end of the guard, and said curvilinear recesses extending from position adjacent and partially surrounding the axis of said catch, a coil spring mounted between and guided by said recesses to engage said catch for normally holding said lug near the end of said guard and across the opening of said hook portion, means integral with said spaced side walls and adjacent the ends of said curvilinear recesses opposite said catch for retaining said coil spring in said recesses, and said catch having an arm forming a finger grip for tilting said catch against the tension of said spring and moving said lug to expose the opening in the hook portion of the guard.

6. The combination with a pin guard having a hook portion and slotted opening in the shank thereof and spaced side walls adjacent said shank including oppositely disposed curvilinear recesses and depressions adjacent said recesses, of a catch having trunnions pivoted within said depressions and situated beneath the end of said guard within said opening, said catch having a lug projecting upwardly to a position adjacent said end of the guard, and said curvilinear recesses extending from position adjacent and partially surrounding the axis of said catch, a coil spring mounted between and guided by said recesses to engage said catch for normally holding said lug near the end of said guard and across the opening of said hook portion and said catch having an arm forming a finger grip for tilting said catch against the tension of said spring and moving said lug to expose the opening in the hook portion of the guard.

7. The combination with a pin and a guard attached thereto, said guard having a hook portion and slotted opening in the shank thereof and a space adjacent said opening, of a catch pivoted within said opening beneath the point of said guard and having a lug projecting upwardly to a position adjacent to the end of said guard, a spring adapted to be mounted within said space, while said guard is attached to said pin, to engage said catch to normally hold said lug near the end of said guard and across the opening of said hook portion, members adapted to be bent to position to hold said spring within the space of said guard, and said catch having an arm forming a finger grip for tilting said catch against the tension of said spring and moving said lug to expose the opening in the hook portion of the guard.

In witness whereof, I have hereunto set my hand this 3d day of August, 1929.

GUSTAVUS A. SIEFKEN.